(12) United States Patent
Lien et al.

(10) Patent No.: US 7,004,777 B2
(45) Date of Patent: Feb. 28, 2006

(54) PCI CARD CLIPPING DEVICE

(75) Inventors: Chun-Yi Lien, Panchiao (TW);
Chi-Hao Kang, Tainan Hsien (TW);
Sheng-Fu Hsu, Chungho (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 0 days.

(21) Appl. No.: 10/967,122

(22) Filed: Oct. 19, 2004

(65) Prior Publication Data
US 2005/0202690 A1  Sep. 15, 2005

(30) Foreign Application Priority Data
Mar. 10, 2004 (TW) ............................... 93203650 U

(51) Int. Cl.
*H01R 13/62* (2006.01)
(52) U.S. Cl. ................... 439/327; 439/377; 439/61; 439/64; 361/801
(58) Field of Classification Search ............. 439/61, 439/64, 327, 377; 361/801
See application file for complete search history.

(56) References Cited

U.S. PATENT DOCUMENTS

| | | | |
|---|---|---|---|
| 4,096,547 A * | 6/1978 | Calabro | 439/64 |
| 5,467,254 A * | 11/1995 | Brusati et al. | 174/35 R |
| 6,162,073 A * | 12/2000 | Haq et al. | 439/377 |
| 6,634,898 B1 * | 10/2003 | Clements | 439/327 |

* cited by examiner

*Primary Examiner*—Tho D. Ta
(74) *Attorney, Agent, or Firm*—Rabin & Berdo, PC

(57) ABSTRACT

A PCI card clipping device is disclosed for clipping and securing a plurality of PCI cards. The PCI card clipping device is composed of a clipping member, a fixing base, a latch member connected to the fixing base, and an elastic element (such as a spring), wherein the clipping member has a plurality of clipping elements, and each of the clipping elements is made of a clipping plate located in an opening. In the application of the PCI card clipping device, a connecting end of the PCI card is first engaged with the clipping element, and then the purpose of securing the PCI cards is achieved due to the meal material property of the latch member and the clipping member.

20 Claims, 5 Drawing Sheets

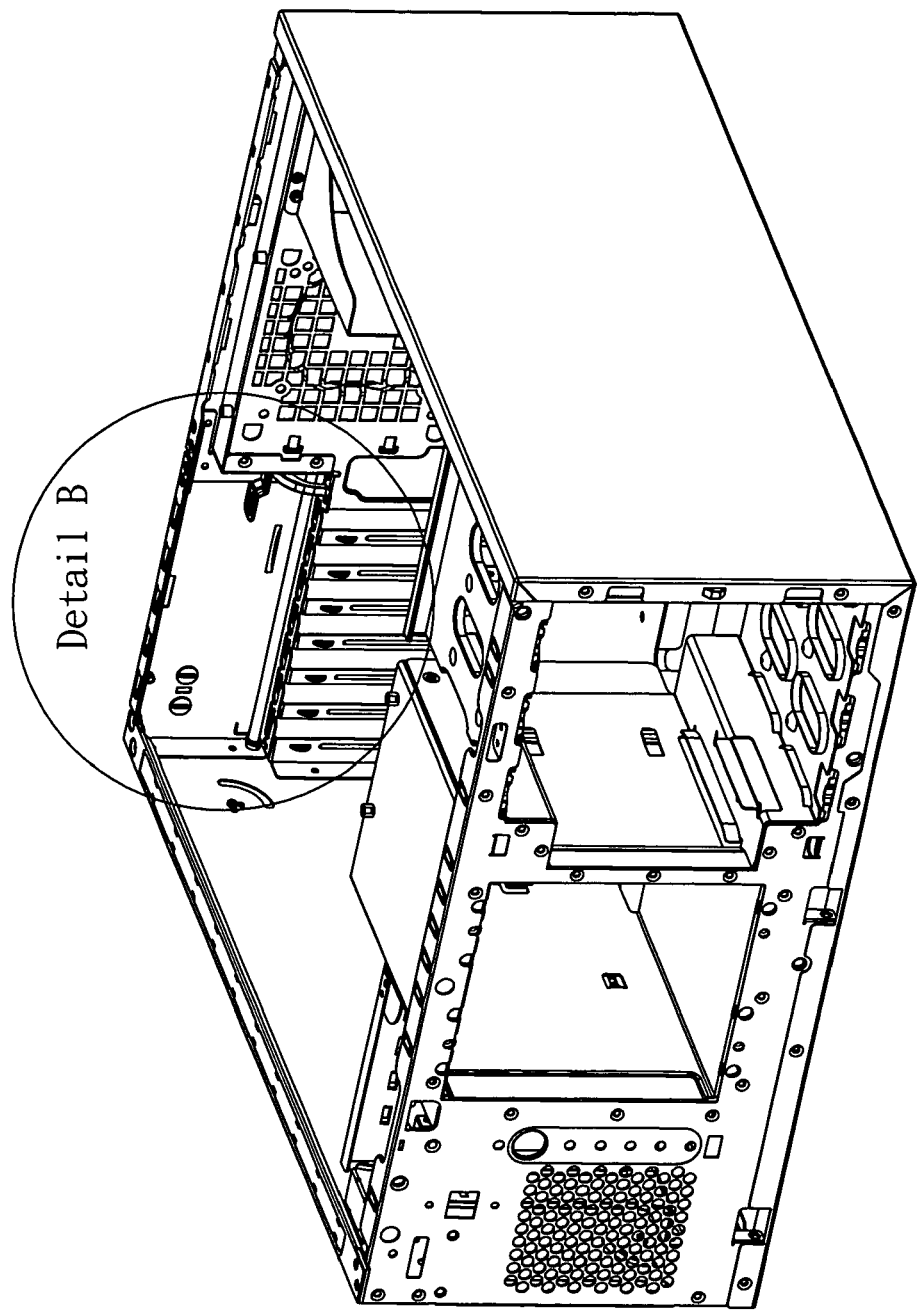

PCI CARD CLIPPING DEVICE

RELATED APPLICATIONS

The present application is based on, and claims priority from, Taiwan Application Serial Number 93203650, filed Mar. 10, 2004, the disclosure of which is hereby incorporated by reference herein in its entirety.

FIELD OF THE INVENTION

The present invention relates to a PCI (Peripheral Component Interconnect) card clipping device, and more particularly, to the PCI card clipping device with no screws.

BACKGROUND OF THE INVENTION

PCI is a standard specification regarding how to connect all the peripheral equipments of a system together in a structured and controllable way. The PCI cards have become a popular device for users to connect the computer peripheral equipments.

Generally speaking, a thin steel plate is installed at one end of a PCI card, and one end of the thin steel plate has an upright folded portion, wherein the upright folded portion has a notch. In a conventional way of installing a PCI card, the PCI card is first inserted into a PCI socket, and then the PCI card is fastened to the computer housing by using a screw inserted through the notch on the upright folded portion of the thin steel plate.

However, a computer generally needs a plurality of PCI cards installed, and with the increase of the peripheral equipments, the number of the PCI cards installed also increases accordingly. Hence, the method of using screws to fasten the PCI cards individually to the computer housing not only is inconvenient, but also is quite troubling for dismantling. More particularly, if the screws are damaged, then it needs to take even more time and effort to dismantle the screws, thus greatly increasing a lot of labor cost for installation and maintenance.

Since it takes a lot of time and effort for the conventional way to fasten the PCI cards individually to the computer housing with screws, the conventional way for fastening the PCI cards can no longer satisfy the user's needs effectively.

Hence, there is a need to develop a PCI card clipping device for fastening PCI cards to a computer housing without using any screw, so as to overcome the disadvantages of the conventional way for fastening the PCI cards.

SUMMARY OF THE INVENTION

It is an object of the present invention to provide a PCI card clipping device for effectively fastening PCI cards to a computer housing without using screws.

It is the other object of the present invention to provide a PCI card clipping device for automatically returning a clipping member so as to briefly dismantling PCI cards.

According to the aforementioned objects of the present invention, the present invention provides a PCI card clipping device for clipping and securing a plurality of PCI cards in a housing.

According to a preferred embodiment of the present invention, the PCI card clipping device comprises a fixing base, a latch member, a clipping member and an elastic element (such as a spring), wherein one end of the fixing base is fixed to the housing.

Further, the latch member comprises a connection portion, an engaging portion and an open portion, wherein one side of the connection portion is connected to a position of the fixing base adjacent to the aforementioned end of the fixing base, and one end of the engaging portion is substantially perpendicular to one end of the connection portion, and the engaging portion has an insetting opening. The other end of the engaging portion is connected to one end of the open portion.

Further, the latch member is located between the housing and the clipping member. The clipping member comprises a clipping portion and an elastic hook portion. One end of the clipping portion is connected to the other end of the fixing base, and the other end of the clipping portion is connected to the housing. The clipping portion has a plurality of clipping elements used for clamping at least one PCI card, and each of the clipping elements is composed of a clipping slice located in an opening. One end of the elastic hook portion is connected to a position of the clipping portion adjacent to the aforementioned end of the clipping portion, and a protrusion portion is located on a position of the elastic hook portion adjacent to the other end of the elastic hook portion for engaging with the insetting opening. Further, the other end of the elastic hook portion aforementioned has an extension portion used for engaging with an opening of the fixing base.

Further, an elastic element is connected to the other end of the elastic portion aforementioned, wherein one end of the elastic element is connected to the housing, thereby generating a return force while the clipping member is rotated.

Hence, with the application of the present invention, the PCI cards can be effectively fastened to a computer housing without using screws; and the clipping member can be returned automatically so as to briefly dismantling PCI cards.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3A a 3-D schematic view showing the PCI card clipping device installed in a housing, according to the preferred embodiment of the present invention.

DETAILED DESCRIPTION OF THE PREFERRED EMBODIMENT

A PCI card clipping device of the present invention is featured in achieving the function of securing PCI cards by using the properties of the metal material forming the latch member and the clipping member. On the other hand, for promoting user's convenience and reducing labor hours, the present invention adds an elastic member (such as a spring) to the PCI card clipping device, thereby enabling the clipping member to have the function of automatically returning to its original shape.

Figure 1:
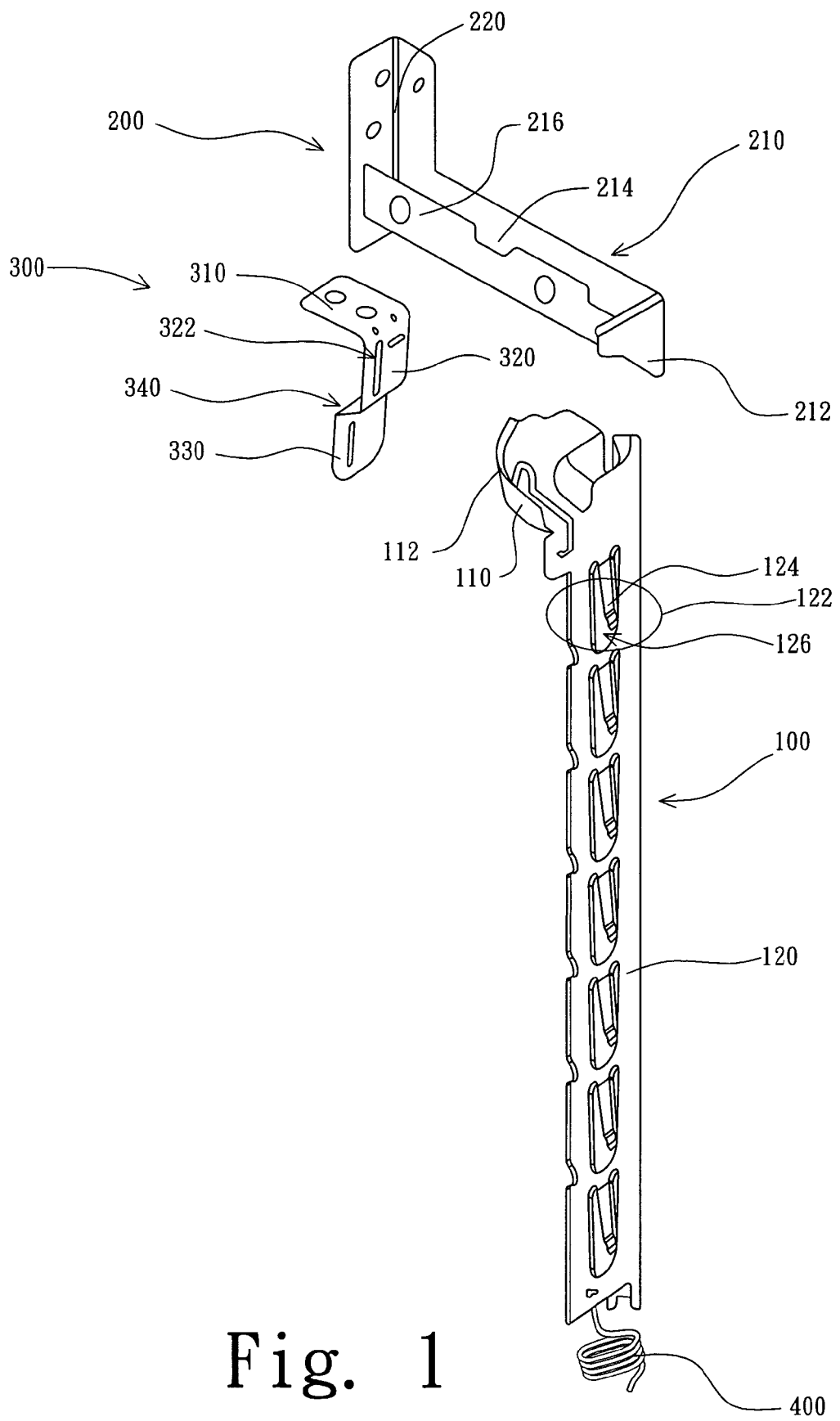
FIG. 1 is an explosive schematic view showing a PCI card clipping device according to a preferred embodiment of the present invention.

Referring to FIG. 1, FIG. 1 is an explosive schematic view showing a PCI card clipping device according to a preferred embodiment of the present invention. The PCI card clipping device of the present invention is composed of a fixing base 200, a latch member 300, a clipping member 100 and an elastic element 400 (such as a spring). The fixing base 200 is designed in the shape according to the housing and its internal structure. Such as shown in FIG. 1, the fixing base 200 is composed of a fixing component 210 and a fixing component 220, wherein the fixing component 220 is of L-shaped cross-section, and the fixing component 210 is a Z-shaped component composed of the plate portions 212, 214 and 216 mutually connected and perpendicular to each other. The plate portion 212 is located below and connects vertically to one side of the plate portion 214, and the plate portion 216 is located above and connects vertically to the other side of the plate portion 214. One end of the fixing component 210 is connected to an upright corner of the fixing component 220.

The latch member 300 is located between the fixing component 220 and the clipping member 100. The latch member 300 comprises a connection portion 310, an engaging portion 320 and an open portion 330, and is made of metal material, wherein one side of the connection portion 310 is connected to a position of the plate portion 214 of the fixing component 210 adjacent to the fixing component 220, and the engaging portion 320 has an insetting opening 322. One end of the engaging portion 320 is substantially perpendicular to one end of the connection portion 310 away from the fixing component 220, and the other end of the engaging portion 320 is connected to one end of the open portion 330. There is a bent portion 340 formed between the engaging portion 320 and the open portion 330, and the bent portion is formed in an angle greater than 90 degrees and smaller than 180 degrees for a user to release or lock the clipping component 100 conveniently. The engaging portion 320 and the open portion 330 are parallel to each other.

The clipping member 100 has a clipping portion 120 and an elastic hook portion 110, and is made of metal material, and one end of the clipping portion 120 is connected to the other end of the fixing component 210 opposite to the fixing component 220, wherein the connection method thereof is: first fabricating an opening on the plate portion 212 in the shape matching the connection end of the clipping portion 120, and then inserting the connection end of the clipping portion 120 into the opening. The other end of the clipping portion 120 is connected to the housing (not shown). The clipping portion 120 has a plurality of clipping elements 122 equally spaced for clamping PCI cards, and each of the clipping elements 122 is composed of a clipping slice 124 located in an opening 126, wherein only one side of clipping slice 124 is connected to one sidewall of the opening 126, and the other three sides of the clipping slice 124 are detached from the opening 126. Further, one end of the elastic hook portion 110 is connected to a position of the clipping portion 120 adjacent to the connection end of the clipping portion 120 connecting to the fixing component 210, and a protrusion portion 112 is located on a position of the elastic hook portion 110 adjacent to the other end (open end) of the elastic hook portion 110 for engaging with the insetting opening 322 of the latch member 300. Further, the aforementioned open end of the elastic hook portion 110 has an extension portion used for engaging with an opening (not shown) located on the plate portion 212 of the fixing base 200. Further, the elastic element 400 is connected to the other end of the clipping portion 120, wherein one end of the elastic element 400 is connected to the housing for generating a return force while the clipping member 100 is rotated.

Figure 2A:
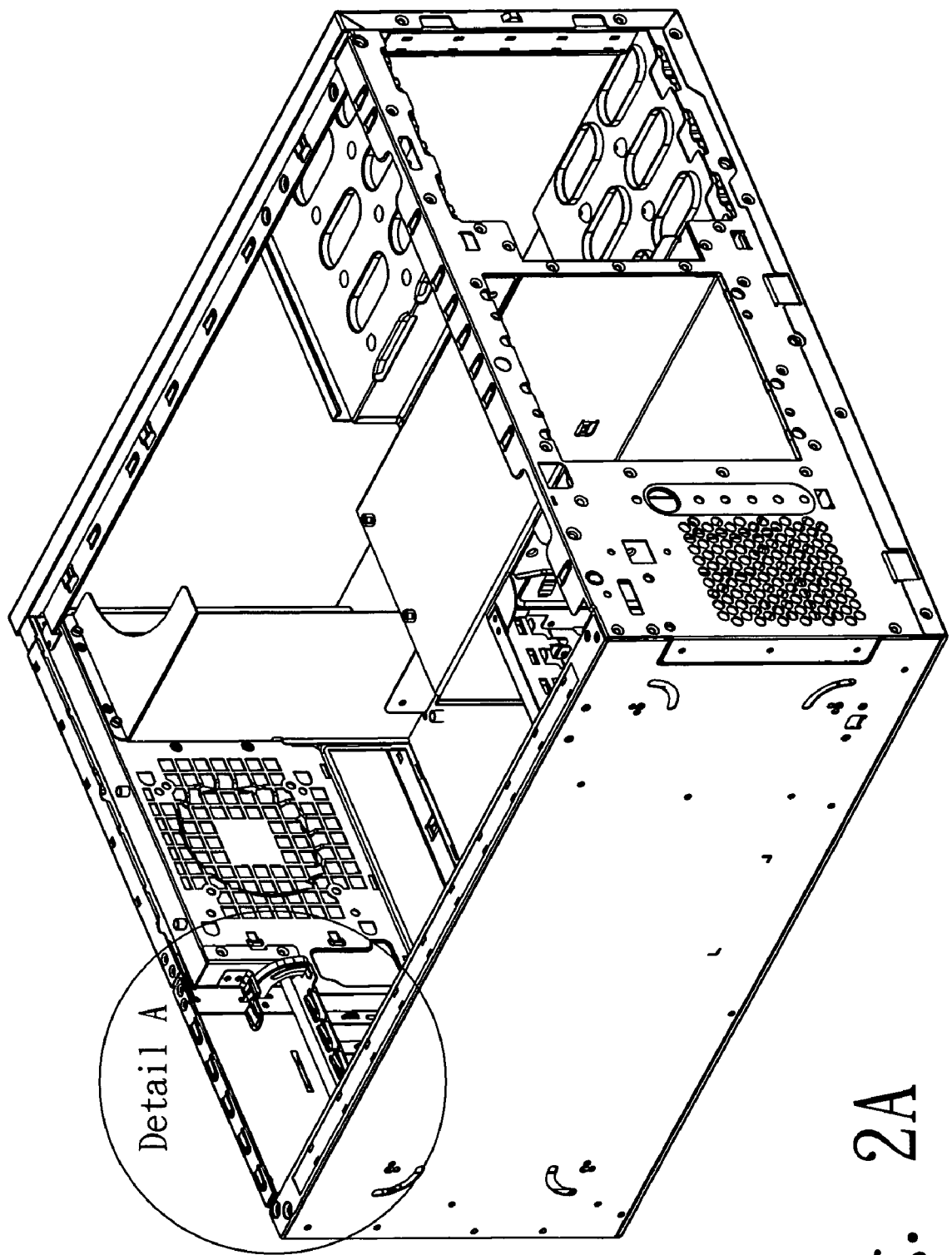
FIG. 2A a 3-D schematic view showing the PCI card clipping device installed in a housing, according to the preferred embodiment of the present invention.
Figure 2B:
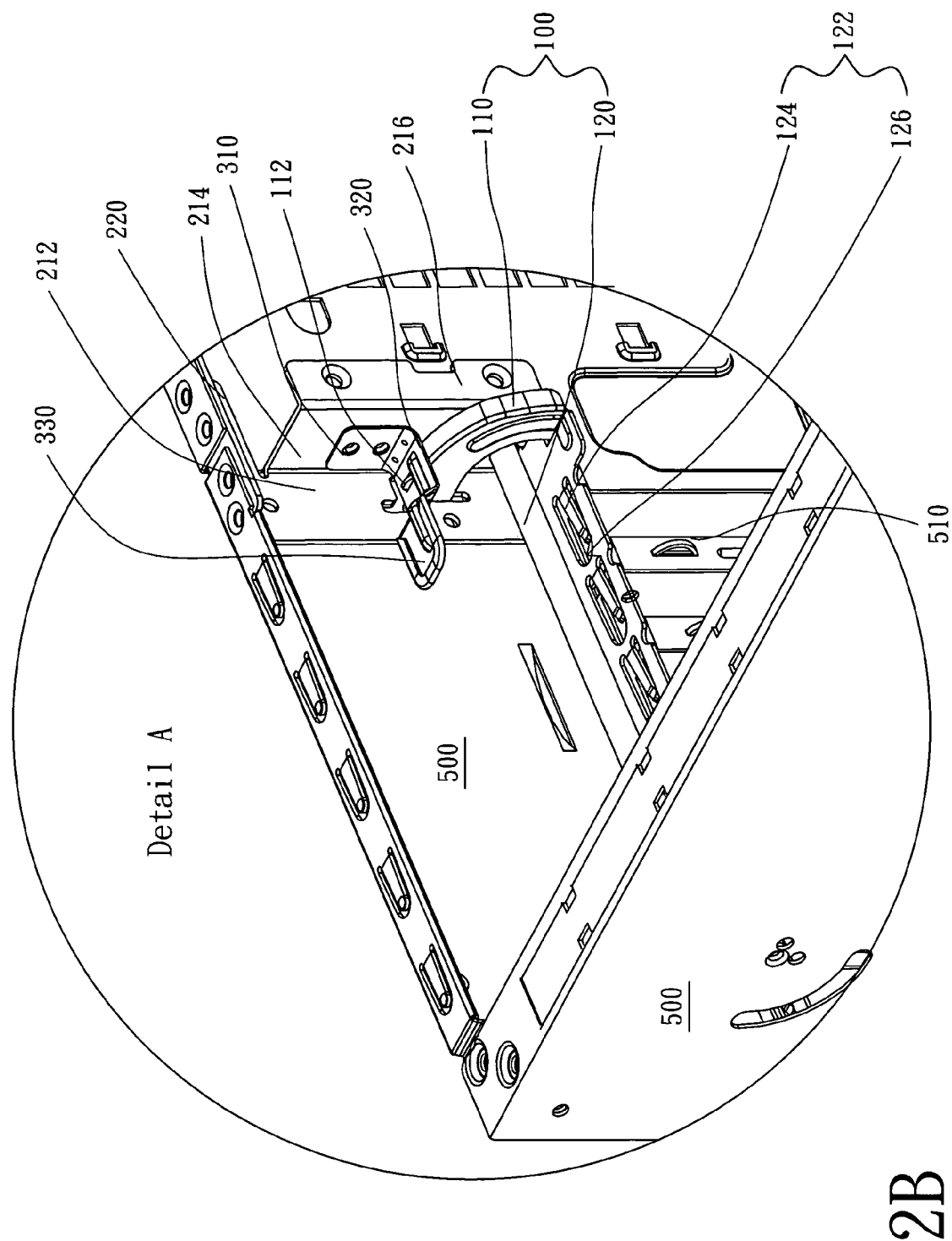
FIG. 2B is an enlarged view of detail A shown in FIG. 2A.
Figure 3B:
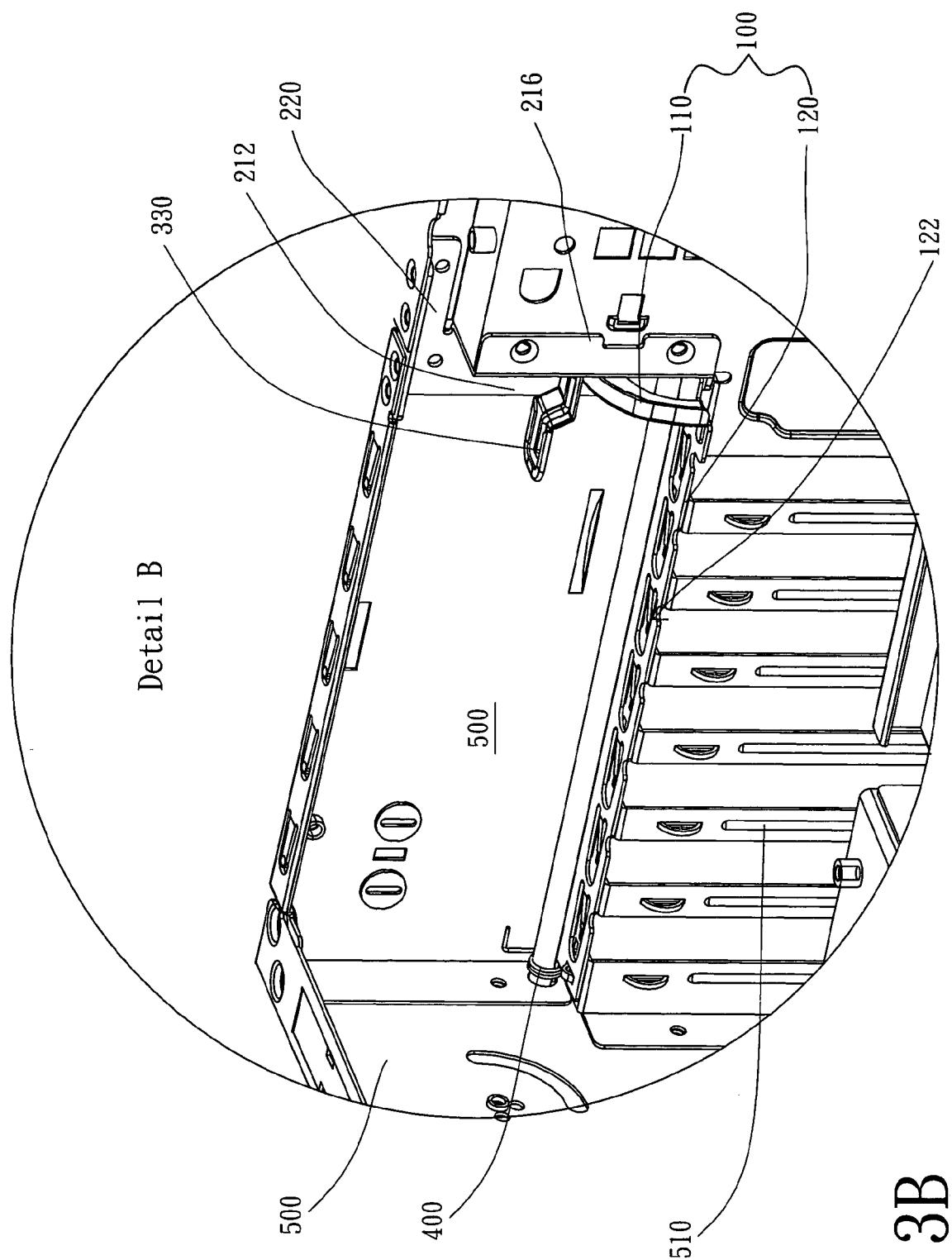
FIG. 3B is an enlarged view of detail B shown in FIG. 3A.

Referring to FIG. 2A and FIG. 3A, FIG. 2A and FIG. 3A are 3-D schematic views respectively showing the PCI card clipping device installed in a housing, according to the preferred embodiment of the present invention. Referring to FIG. 2B and 3B, FIG. 2B is an enlarged view of detail B shown in FIG. 2A; and FIG. 3B is an enlarged view of detail B shown in FIG. 3A.

At first, the fixing base 200, the latch member 300, the clipping member 100 and the elastic member 400 are assembled, such as shown in FIG. 1. Thereafter, such as shown in FIG. 2A and FIG. 2B, the fixing base 200 is fixed to the housing 500. Such as shown the present embodiment, the fixing component 220 and the plate portion 212 of the fixing component 210 are mounted on the sidewall of the housing 500, and the plate portions 214 and 216 of the fixing component 210 are mounted on the internal structure of the housing 500. Then, one end of the clipping portion 120 of the clipping member 100 having the elastic element 400 installed is connected to the housing 500. Thereafter, a thin steel plate located on one end of a PCI card 510 is engaged with the clipping slice 124 located in the opening 126 of the clipping element 122.

Thereafter, such as shown in FIG. 2B, the elastic hook portion 110 of the clipping member 100 is pressed downwards, and then the protrusion portion 112 of the elastic hook portion 110 is engaged with the insetting opening 322 of the latch member 300, and the extension portion is engaged with the opening (not shown) located on the plate portion 212 of the fixing component 210. When the elastic hook portion 100 with the related latch member 300 and the fixing component 210, the clipping member 100 can be firmly tightened up via the properties of the metal material forming the latch member 300 and the clipping member 100, thereby achieving the function of locking the PCI card 510.

Further, such as shown in FIG. 3B, while the elastic hook portion 110 is being pressed down to rotate the clipping portion 120, the elastic element 400 of which one end is connected to the housing 500 is deformed to generate a return force (force resisting the deformation) used for resisting the twisting force generated by pressing down the elastic hook portion 110. When the open end 330 of the latch member 300 is lifted up so as release the elastic hook portion 110 from the latch member 300, the aforementioned return force of the elastic element 400 can rapidly return the clipping member 100 back to the relaxed state, so that the PCI card 510 can be separated from the clipping element 122.

It worthy to be noted that the material, positions and shapes regarding the aforementioned components are merely stated as an example for explanation, and the present invention is not limited thereto.

It can be known from the aforementioned preferred embodiment of the present invention, the present invention has the advantages of effectively fastening PCI cards to a computer housing without using screws; automatically returning a clipping member so as to briefly dismantling PCI cards.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A PCI (Peripheral Component Interconnect) card clipping device, used for clipping and securing a plurality of PCI cards located in a housing, said PCI card clipping device comprising:
    a fixing base;
    a latch member, fastened to said fixing base, wherein said latch member has an insetting opening;
    a clipping member, wherein said latch member is located between said housing and said clipping member, said clipping member comprising:
        a clipping portion, wherein one end of said clipping portion is connected to said fixing base, and the other end of said clipping portion is connected to said housing, said clipping portion having a plurality of clipping elements used for clamping said PCI cards; and
        an elastic hook portion, wherein one end of said elastic hook portion is connected to a first position of said clipping portion adjacent to said one end of said clipping portion, and a protrusion portion is located on a second position of said elastic hook portion adjacent to the other end of said elastic hook portion for engaging with said insetting opening; and
    an elastic element, connected to said other end of said elastic portion, wherein one end of said elastic element is connected to said housing, thereby generating a return force while said clipping member is rotated.

2. The PCI card clipping device of claim 1, wherein said latch member comprises:
    a connection portion, secured to said fixing base;
    an engaging portion, wherein one end of said engaging portion is substantially perpendicular to one end of said connection portion, said engaging portion having said insetting opening; and
    an open portion, wherein the other end of said engaging portion is connected to one end of said open portion.

3. The PCI card clipping device of claim 1, wherein said other end of said elastic hook portion has an extension portion used for engaging with an opening of said fixing base.

4. The PCI card clipping device of claim 1, wherein each of said clipping elements is composed of a clipping slice located in an opening, and only one side of said clipping slice is connected to one sidewall of said opening, and the other sides of said clipping slice are detached from said opening.

5. The PCI card clipping device of claim 1, wherein said clipping member is made of metal material.

6. The PCI card clipping device of claim 1, wherein said latch member is made of metal material.

7. The PCI card clipping device of claim 1, wherein said elastic element is a spring.

8. The PCI card clipping device of claim 1, wherein said clipping elements are equally spaced on said clipping portion.

9. The PCI card clipping device of claim 1, wherein said elastic hook portion is bent from said clipping portion towards said latch member.

10. The PCI card clipping device of claim 1, wherein an angle is formed between said engaging portion and said open portion.

11. The PCI card clipping device of claim 1, wherein said angle is greater than 90 degrees and smaller than 180 degrees.

12. A PCI card clipping device, used for clipping and securing a plurality of PCI cards located in a housing, said PCI card clipping device comprising:
    a fixing base, wherein one end of said fixing base is fixed to said housing;
    a latch member, comprising:
        a connection portion, wherein one side of said connection portion is connected to a first position of said fixing base adjacent to said one end of said fixing base;
        an engaging portion, wherein one end of said engaging portion is substantially perpendicular to one end of said connection portion located away from said fixing base, said engaging portion having an insetting opening; and
        an open portion, wherein the other end of said engaging portion is connected to one end of said open portion;
    a clipping member, wherein said latch member is located between said housing and said clipping member, said clipping member comprising:
        a clipping portion, wherein one end of said clipping portion is connected to the other end of said fixing base, and the other end of said clipping portion is connected to said housing, said clipping portion having a plurality of clipping elements used for clamping said PCI cards; and
        an elastic hook portion, wherein one end of said elastic hook portion is connected to a second position of said clipping portion adjacent to said one end of said clipping portion, and a protrusion portion is located on a third position of said elastic hook portion adjacent to the other end of said elastic hook portion for engaging with said insetting opening; and
    an elastic element, connected to said other end of said elastic portion, wherein one end of said elastic element is connected to said housing, thereby generating a return force while said clipping member is rotated.

13. The PCI card clipping device of claim 12, wherein said other end of said elastic hook portion has an extension portion used for engaging with an opening of said fixing base.

14. The PCI card clipping device of claim 13, wherein each of said clipping elements is composed of a clipping slice located in an opening, and only one side of said clipping slice is connected to one sidewall of said opening, and the other sides of said clipping slice are detached from said opening.

15. The PCI card clipping device of claim 12, wherein said clipping member and said latch member are made of metal material.

16. The PCI card clipping device of claim 12, wherein said elastic element is a spring.

17. The PCI card clipping device of claim 12, wherein said clipping elements are equally spaced on said clipping portion.

18. The PCI card clipping device of claim 12, wherein said elastic hook portion is bent from said clipping portion towards said latch member.

19. The PCI card clipping device of claim 12, wherein an angle is formed between said engaging portion and said open portion.

20. The PCI card clipping device of claim 12, wherein said angle is greater than 90 degrees and smaller than 180 degrees.

* * * * *